United States Patent
Knee et al.

(10) Patent No.: US 6,865,224 B1
(45) Date of Patent: Mar. 8, 2005

(54) BIT RATE CONTROL FOR VIDEO DATA COMPRESSION

(75) Inventors: Michael James Knee, Petersfield (GB); Emma Gottesman, Dublin (IE)

(73) Assignee: Snell & Wilcox Limited, Twickenham (GB)

( * ) Notice: Subject to any disclaimer, the term of this patent is extended or adjusted under 35 U.S.C. 154(b) by 0 days.

(21) Appl. No.: 09/890,221

(22) PCT Filed: Jan. 28, 2000

(86) PCT No.: PCT/GB00/00252
§ 371 (c)(1),
(2), (4) Date: Nov. 16, 2001

(87) PCT Pub. No.: WO00/45605
PCT Pub. Date: Aug. 3, 2000

(30) Foreign Application Priority Data

Jan. 28, 1999 (GB) ............................................. 9901936

(51) Int. Cl.[7] .............................................. H04N 7/12
(52) U.S. Cl. ............................. 375/240.03; 375/240.07; 375/240.27
(58) Field of Search ...................... 375/240.05, 240.07, 375/240.12, 240.27

(56) References Cited

U.S. PATENT DOCUMENTS

| 5,638,126 A | 6/1997 | Lim |
| 5,680,483 A | 10/1997 | Tranchard |
| 5,717,464 A | 2/1998 | Perkins et al. |
| 5,768,431 A | 6/1998 | Saunders et al. |
| 6,151,362 A * | 11/2000 | Wang ..................... 375/240.12 |
| 6,269,120 B1 * | 7/2001 | Boice et al. ........... 375/240.12 |
| 6,278,735 B1 * | 8/2001 | Mohsenian ................. 375/240 |
| 6,570,922 B1 * | 5/2003 | Wang et al. ........... 375/240.12 |

FOREIGN PATENT DOCUMENTS

| EP | 0825779 A1 | 2/1998 |
| EP | 0836329 A1 | 4/1998 |

* cited by examiner

Primary Examiner—Benjamin C. Lee
Assistant Examiner—George A Bugg
(74) Attorney, Agent, or Firm—Michael Best & Friedrich LLP

(57) ABSTRACT

In MPEG2 encoding, the quantiser is controlled to manage the occupancy of a video buffer. A dynamically varying working range is determined by forecasting from recent coding history the number of bits required in coding of future pictures, and deriving upper and lower ends of the working range which correspond respectively with attainment within the forecast period of predetermined maximum and minimum buffer occupancies. The quantiser scale is then controlled through the position of the actual buffer occupancy within that working range.

18 Claims, 2 Drawing Sheets

BIT RATE CONTROL FOR VIDEO DATA COMPRESSION

Figure 1:
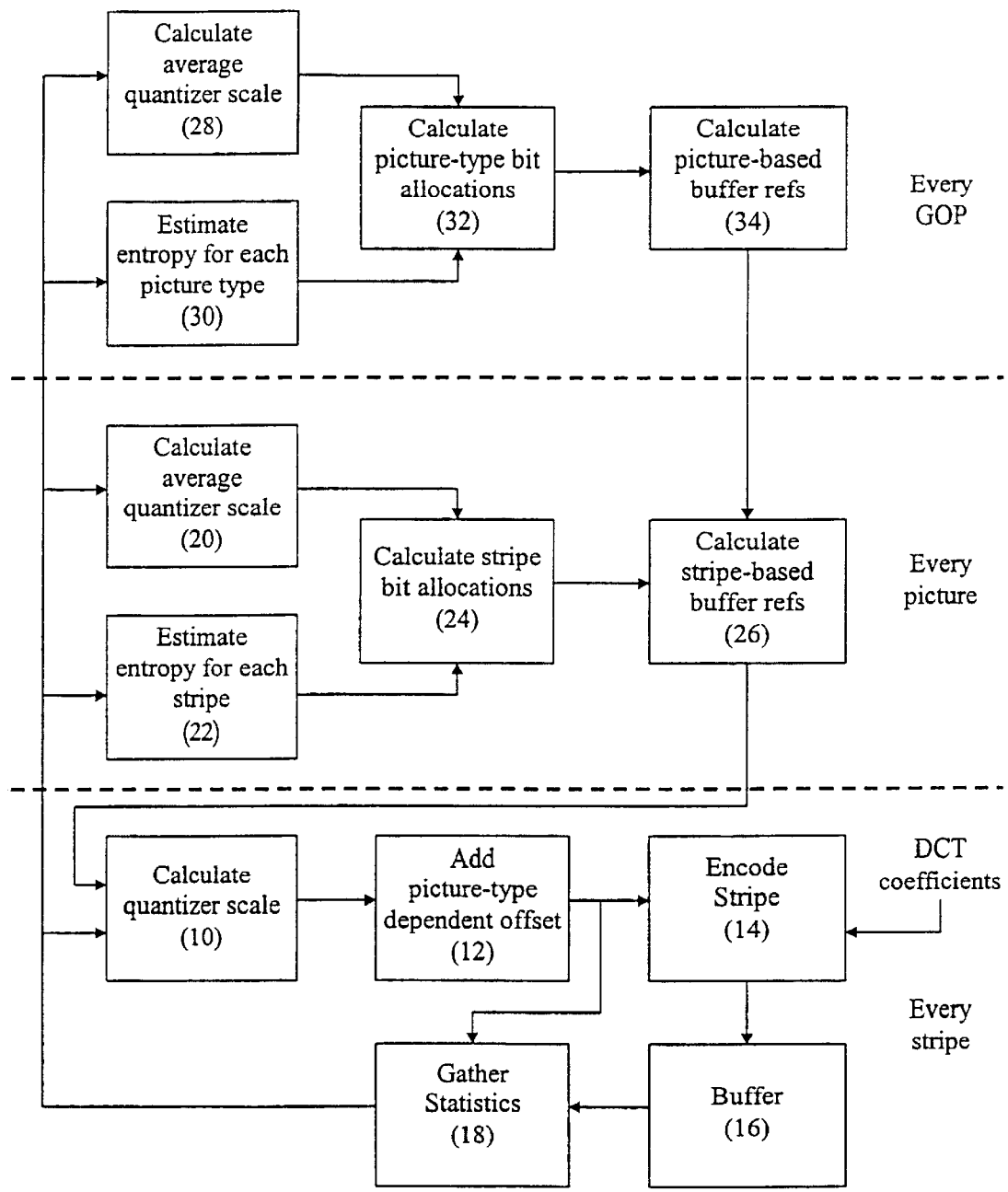

This invention relates to bit rate control in compression and in one important example to methods for controlling the bit-rate of an MPEG encoder.

This invention applies to any compression system involving variable-length coding and requiring buffers in the encoder and the decoder so that changes in instantaneous bit-rate can be smoothed out for transmission at a fixed (or slowly varying) bit rate. In any such system, it is necessary to control the instantaneous bit-rate at the input to the encoder buffer so that the desired transmission bit-rate can be maintained without causing buffer underflow or overflow or undue variations in coding quality. The control mechanism is referred to in this specification as rate control.

An important example of such a compression system is the MPEG-2 video compression standard [see: *Information technology—Generic coding of moving pictures and associated audio information—Part 2: Video. International Standard* ISO/IEC 13818-2: 1996.]. In MPEG-2, the instantaneous bit-rate at the input to the encoder buffer is most readily controlled by a parameter known as quantiser_scale_code, which can be varied from one macroblock (16×16 block) to the next. Because such rapid variations in quantiser_scale_code have little effect on the status of the buffer, it is usual for rate controllers to control the quantiser on a longer term basis, typically varying a base value of quantiser_scale_code once per stripe, or row of macroblocks across the picture. Macroblock variations modulating the stripe-based value are typically calculated by a process known as adaptive quantization [see: *Information technology—Generic coding of moving pictures and associated audio information—Part 5: Software simulation. International Standard* ISO/IEC TR 13818-5: 1997].

There are many published examples of rate control methods; these give rise to a number of problems. In some cases there is a simple failure to guarantee that the decoder buffer will not overflow or underflow. Often there is a failure to take account of variations in picture activity or group-of-pictures (GOP) structure. There may be undue fluctuations in coding quality. Some methods require two or more passes through the sequence to be coded, others are unstable.

It is an object of the present invention to provide an improved method of rate control which overcomes or reduces some or all of the above problems.

Accordingly, the present invention consists in one aspect in a method of rate control for use in compression coding of digital video in which a parameter affecting bit rate is controlled to manage the occupancy of a video buffer, characterised in that the parameter is controlled through the position of the actual buffer occupancy within a dynamically varying working range of buffer occupancies, the working range being determined by forecasting from recent coding history the number of bits required in coding of future pictures, and deriving upper and lower ends of the working range which correspond respectively with attainment within the forecast period of predetermined maximum and minimum buffer occupancies.

Preferably, the forecast includes estimates of the number of bits required for each picture in a group of pictures.

Suitably, the forecast includes estimates of the number of bits required for different parts of each picture.

Typically, the parameter affecting bit rate is the quantiser scale.

In a further aspect, the present invention consists in one aspect in a method of rate control for use in image compression coding, in which the quantizer scale or other parameter affecting bit rate is varied in dependence on video buffer occupancy, an upper reference buffer occupancy, and a lower reference buffer occupancy, wherein the quantizer scale is a linear function of the buffer occupancy, the lower reference buffer occupancy and the upper reference buffer occupancy; a picture-rate component of the lower reference buffer occupancy is calculated as a function of estimates of the number of bits required for each picture in a group of pictures; the lower reference buffer occupancy is offset in such a way that the minimum value corresponds to a minimum desired buffer occupancy; and the upper reference buffer occupancy is calculated as a fixed offset from the lower reference buffer occupancy, such that its maximum value corresponds to a maximum desired buffer occupancy.

Preferably, the lower reference buffer occupancy is varied within pictures as a function of the estimates of the relative number of bits required for different parts of the picture, derived from recent coding history.

Suitably, the calculation of the reference buffer occupancies is modified to ensure that the difference between upper and lower values exceeds a specified minimum.

Advantageously, the relative bit count estimates are slowly modified from one group of pictures to the next, taking into account an estimate of the actual number of bits that would have been used in the current group of pictures had the quantizer scale been at a constant value.

In a preferred form of the invention, the relative bit count estimates are initialised at start-up and following a scene change.

Advantageously, the calculation of the reference buffer occupancies can be modified to ensure that the difference between upper and lower values exceeds a specified minimum.

The quantizer scale actually used in encoding may be offset by a constant that depends on the picture type (intra coded, predicted or bidirectionally predicted).

The method of rate control described here as a preferred embodiment is simple to implement. It can be performed by standard, commercially available digital signal processors (DSPs) in real time. It is very stable in operation and leads to very consistent decoded picture quality. It requires only one pass through the picture material to be encoded. It adapts well to changes in picture content but can also bring maximum efficiency when the picture statistics change only slowly.

Figure 2:
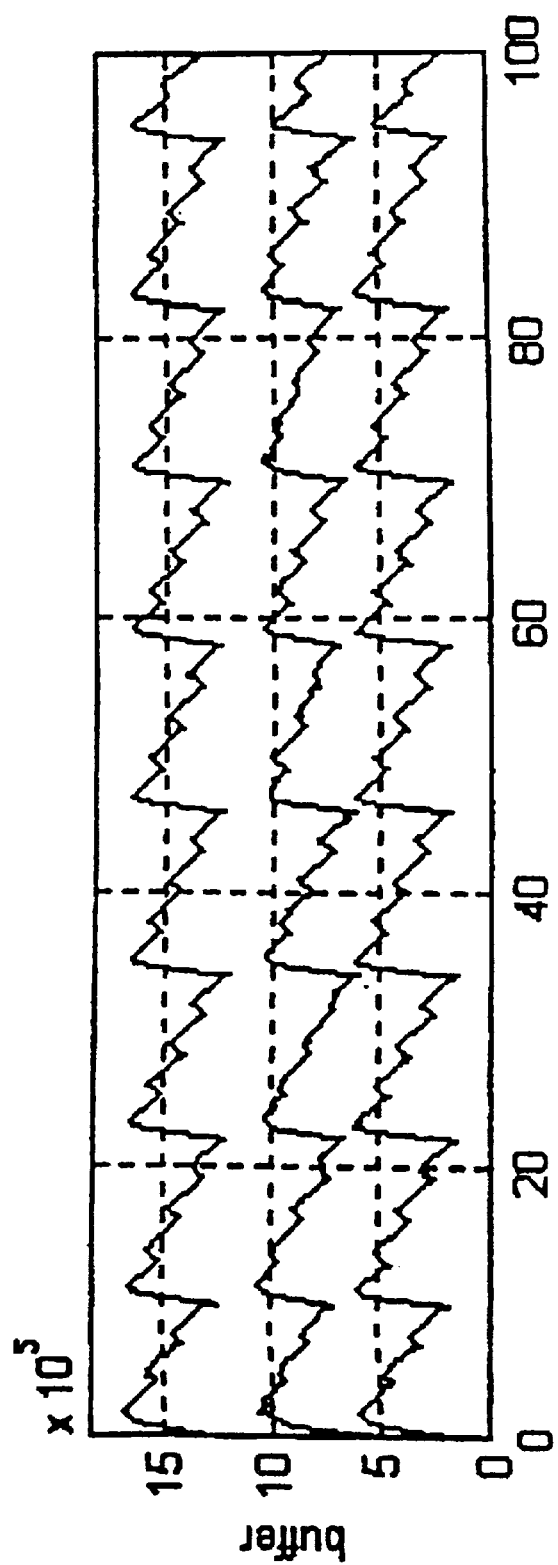

A particular example of the method applied to MPEG-2 encoding will now be described by way of example, with reference to the accompanying drawings, in which:

FIG. 1 is a block diagram of a preferred embodiment of rate controller according to the invention; and FIG. 2 shows reference and actual buffer occupancy graphs.

The approach taken in the preferred form of the present invention is to control the quantiser scale as a simple function of where the actual buffer occupancy lies within a dynamically varying working range. This working range is defined by upper and lower reference buffer occupancies. The upper (for example) reference buffer occupancy is determined by forecasting the number of bits required to encode a number of pictures and developing from this an occupancy trajectory which will meet but not exceed a predetermined maximum buffer occupancy. This might be set—for instance—at 90% or 95% of the physical maximum occupancy of the buffer. By offsetting the trajectory in the opposite sense to meet a predetermined minimum buffer occupancy, the lower reference buffer occupancy is similarly determined.

The derivation of the working range can be sophisticated, taking into account recent coding history in carefully managed ways and employing complex relationships between quantiser scale and projected buffer occupancy.

Actual control of the quantiser scale is in contrast very simple, typically as a linear function of the position of actual buffer occupancy within this range.

Reference is now directed to FIG. 1 and, for convenience, the description begins with the stripe rate processes. In MPEG2 encoding, a stripe is a row of macroblocks across the picture.

In block 10 (Calculate quantizer scale) the quantizer scale is calculated once per stripe by the following simple linear formula:

$$\text{quantizer scale code} = q_{min} + (q_{max} - q_{min}) * (B_O - B_{ref\_lower}) / (B_{ref\_upper} - B_{ref\_lower})$$

where $B_O$=buffer occupancy $B_{ref\_lower}$=lower reference buffer occupancy $B_{ref\_upper}$=upper reference buffer occupancy $q_{min}$=1, $q_{max}$=31

The quantizer scale is a function of quantizer scale code as well known and as described for example in the above cited references.

An aim of the rate control process is to maintain constant picture quality. This is largely attained by seeking to maintain a constant value of quantizer scale. However, it is observed that a closer approximation to constant visual quality can be obtained by adding a fixed offset, for example 1, to the quantizer scale code for P (predicted) pictures and a second offset, for example 3, for B (bidirectionally predicted) pictures. This is achieved in block 12 (Add picture-type dependent offset). The remainder of the rate control process uses the unmodified quantizer scale except when processing information about the quantizer actually used.

Block 14 (Encode stripe) is not part of the rate control method itself but performs the actual encoding of the DCT coefficients using the calculated stripe quantizer scale. The encoding technique may modify the quantizer on a macroblock basis according to a measure of criticality or other adaptive quantization technique, for example as described in the above cited references. These variations in quantizer scale may be ignored by the rate control process since they can be considered instead to arise from variations in picture content. The output of the encoding process is the variable-length coded video elementary stream.

Buffer 16 is the elementary stream buffer, which is written from the variable-length coder and read into the transmission channel. The most important task of the rate control process is to ensure that this buffer (and the complementary downstream decoder buffer) never overflows or underflows. However, it is usual in MPEG coding to implement 'emergency' procedures to provide a final 'safety net', for example by removing DCT coefficients to prevent overflow and by stuffing to prevent underflow. These procedures are not considered part of the rate control process being described here.

Block 18 (Gather statistics) records the following information from the current encoding operation to be used in the control process:

Quantizer scale used for the stripe

Number of coefficient bits generated for the stripe

Buffer occupancy

There will now be described the operations that are carried out at picture rate. The purpose of these is to correct the calculated buffer references for variations in picture activity from stripe to stripe, in order to try to achieve a constant quantizer scale across the picture. Note that these picture-rate operations are optional and can be omitted if a simpler rate control process is desired.

The function of block 20 (Calculate average quantizer scale) is to calculate the average quantizer scale used in the previous picture of the same type (I, P or B). Block 22 (Estimate activity for each stripe) calculates an estimate of picture activity or entropy for each stripe in the previous picture of the same type, from the quantizer scale used for that stripe and the number of coefficient bits generated. A particularly useful mathematical model for this estimate is described below.

In block 24 (Calculate stripe bit allocations ), the mathematical model is applied to the stripe activity estimates and the average quantizer scale value to generate an estimated bit allocation for each stripe. The previously calculated picture-based buffer references, which allocated an equal number of bits to each stripe, are modified in block 26 (Calculate stripe-based buffer references) so that the numbers of bits allocated to each stripe are distributed in proportion to the stripe bit allocations derived in the previous step.

Finally, there will be described the operations that are carried out at GOP rate (once every group of pictures). The purpose of these is to distribute the bits available for the GOP over the pictures in the GOP, according to picture type.

Block 28 (Calculate average quantizer scale) calculates the average quantizer scale (without picture-type offsets) used in the previous GOP. Block 30 (Estimate activity for each picture type) calculates an estimate of picture activity or entropy for each picture type in the previous GOP, from the average quantizer scale used for that picture type and the number of coefficient bits generated, using the mathematical model described below.

In block 32 (Calculate picture-type bit allocations), the mathematical model is applied to the picture-type entropy estimates and the average quantizer scale value to generate an estimated bit allocation for each picture type.

An alternative approach, which may be used to involve a longer history in the calculation of picture-type bit allocations, thereby limiting the effect of sudden changes, is to express each new bit allocation as the linear combination of a running estimate and the value just calculated using statistics from the previous GOP. A typical formula is to express the new running estimate as 80% of the current one plus 20% of the newly calculated value.

For each picture type, the picture-type bit allocations are divided equally between the pictures of that type in the GOP. Knowledge of the likely structure of the GOP is then used in block 34 (Calculate picture-based buffer references) to convert the picture-based bit allocations into picture-based buffer reference graphs, assuming at this point that the bits allocated to each picture are distributed evenly across the picture.

In this context, a buffer reference graph is a graph of buffer occupancy against time, based on the transmission bit rate, the GOP structure and the number of bits allocated to each picture. This information uniquely determines the shape of the graph apart from an overall offset. In the invention, two versions of the buffer reference graph are generated, with different offsets. The lower reference buffer occupancy has an offset calculated such that the minimum of the graph is at a specified minimum buffer occupancy, typically specified as 10% of the buffer capacity. Likewise, the upper reference buffer occupancy has an offset calculated such that the maximum of the graph is at a specified maximum buffer occupancy, typically 90% of the buffer capacity.

An example of the two reference buffer occupancy graphs over several GOPs is shown in FIG. 2. The top and bottom curves are the upper and lower reference buffer occupancies and the middle curve is an example of the actual buffer occupancy that might be obtained. In this example, the middle curve remains almost parallel to the reference curves, indicating that the controller is succeeding in maintaining a fairly constant quantizer scale value. In all the curves, the steeply rising portion represents the I-frame, during which the buffer is filled, the slightly rising sections represent the P frames and the falling sections represent the B-frames.

This concludes the description of the basic embodiment of the invention shown in FIG. 1.

The invention envisages a number of optional features, which improve upon the performance of the basic system.

For example, following a scene change, and when the encoder is first switched on, it may not be appropriate to use previous statistics in the calculation of picture-type bit allocations. In this case, the picture-type-based bit allocations can be reset to default values. It has been found that the relative distributions of bits between I, P and B frames can advantageously be made to depend on the bit rate at which the encoder is working. For example, a possible table of bit allocations for different bit rates is given here. The figures are expressed as percentages of the bit allocations for I frames.

| Bit rate from | to (Mbit/s) | P frames % | B frames % |
|---|---|---|---|
| 0 | 0.75 | 19 | 7 |
| 0.75 | 1.25 | 31 | 14 |
| 1.25 | 1.75 | 39 | 20 |
| 1.75 | 2.5 | 42 | 23 |
| 2.5 | 3.5 | 49 | 30 |
| 3.5 | 5 | 53 | 35 |
| 5 | 7 | 60 | 43 |
| 7 | 10 | 65 | 50 |
| 10 | 15 | 71 | 58 |

In some circumstances, particularly when encoding at a high bit rate, the number of bits allocated to the I-frame in a GOP is so high that the difference between the upper and lower buffer reference graphs becomes very small. The effect of this is that small variations in buffer occupancy from expected values can produce very large changes in quantizer scale, leading to reduced overall quality and the appearance of an unstable control process. One form of the invention therefore limits the difference between the buffer references to a minimum, which implies limiting the number of bits allocated to the I-frame to a maximum. If the number of bits originally allocated to the I-frame exceeds this maximum, the bit allocation is corrected and the increased number of bits available for the P and B-frames is distributed among those frames in such a way that the buffer reference graph is a scaled version of the original.

The processes described so far are based on knowledge of the GOP structure in advance. Sometimes, the GOP structure has to change at short notice, for example in response to detection of a scene change. There are two possibilities: a new GOP starts before it is expected or the GOP is longer than expected.

In the first case, the buffer occupancy at the start of a new GOP will be much higher than expected. The rate control process will therefore have to allocate fewer bits than normal to the new GOP. The process described does this automatically so there is no need for any special provision in this case. The reduced number of available bits will mean that the quality will suffer a temporary degradation, but this is not normally visible after a scene change because of the well-known phenomenon of 'temporal masking'.

In the second case, the end of a GOP has been reached but the processes usually invoked at the start of a GOP cannot be used because the structure of the next GOP is not yet known. A so-called 'mini-GOP' routine is invoked, in which the encoder is assumed to be at the start of a small group of pictures containing one P-frame and the expected number of B-frames (which is usually constant, and is taken to be the number of consecutive B-frames most recently encountered). The routine works in the same way as the processing at the start of a normal GOP except that the picture-type bit X allocations are not updated.

The above description refers several times to a mathematical model which links the quantizer scale to the coefficient bit count through a parameter referred to as 'entropy'. The exact interpretation of entropy in this context is not important since it only serves as an intermediate variable and is never directly measured or used.

The model presented here is an example only, derived from simulations of MPEG2 encoding on several sequences representing a wide range of picture material. It consists of three formulae, one for each picture type.

I frames: $H_I = C_I s_I^{0.7005}$

P frames: $H_P = C_P 10^{0.0982 q_P}$

B frames: $H_B = C_B 10^{0.0115 q_B}$ where H refers to entropy, C refers to the number of coefficient bits, s refers to quantiser_scale as defined in the above cited references and q refers to quantiser_scale_code which is related to quantiser_scale by the nonlinear law described above.

In the rate controller, the model is used to estimate a bit count for a certain quantizer scale, given a measured bit count and associated value of quantizer scale.

It will be understood that this invention has been described by way of examples only and still further modifications are possible within the scope of the invention. Thus, for example, other techniques will occur to the skilled man for determining the described working range. Moreover, whilst the example has been taken of MPEG2, the invention will apply to other digital video compression technique which rely upon buffer management.

What is claimed is:

1. A method of rate control for use in compression coding of digital video in which a parameter affecting bit rate is controlled to manage the occupancy of a video buffer, the method comprising controlling the parameter through the positioning of an actual buffer occupancy within a dynamically varying working range of buffer occupancies defined by upper and lower buffer occupancy trajectories, the trajectories being determined by forecasting a number of bits required in coding of future pictures, and chosen such that upper and lower limits of the working range correspond respectively with attainment within a forecast period of predetermined maximum and minimum buffer occupancies, the number of bits assigned to any picture being limited to a maximum such that the dynamically varying working range always exceeds a specified minimum length.

2. A method according to claim 1, wherein the forecasting the number of bits includes estimating the number of bits required for each picture in a group of pictures.

3. A method according to claim 1, wherein the forecasting the number of bits includes estimating from recent coding history the number of bits required for different parts of each picture in a group of pictures.

4. A method according to claims 1, wherein the parameter affecting bit rate is a quantizer scale.

5. A method of rate control for use in image compression coding, the method comprising varying a quantizer scale in dependence on a video buffer occupancy, an upper reference buffer occupancy, and a lower reference buffer occupancy, the quantizer scale being a linear function of the video buffer occupancy, the lower reference buffer occupancy and the upper reference buffer occupancy; calculating a picture-rate component of the lower reference buffer occupancy as a function of a number of estimated bits required for each picture in a group of pictures; offsetting the lower reference buffer occupancy in such a way that the minimum value corresponds to a minimum desired buffer occupancy; and calculating the upper reference buffer occupancy as a fixed offset from the lower reference buffer occupancy, such that its maximum value corresponds to a maximum desired buffer occupancy.

6. A method according to claim 5, and further comprising varying the lower reference buffer occupancy within each picture as a function of a relative number of estimated bits required for different parts of the picture, the estimates being derived from recent coding history.

7. A method according to claim 5, and further comprising modifying the upper and lower reference occupancies to ensure that the difference between upper and lower values exceeds a specified minimum.

8. A method according to claim 5, and further comprising slowly modifying the estimated bit count from one group of pictures to the next, taking into account an estimate of the actual number of bits that would have been used in the current group of pictures had the quantizer scale been at a constant value.

9. A method according to claim 6, and further comprising initializing the relative estimated bit count at start-up with values that may depend on the transmission bit rate.

10. A method according to claim 6, and further comprising initializing the relative estimated bit count following a scene change with values that may depend on the transmission bit rate.

11. A method according to claim 5, offsetting the quantizer scale used in the encoding by a constant that depends on the picture type.

12. A method according to claim 11 wherein the picture type is intra coded.

13. A method according to claim 11 wherein the picture type is predicted.

14. A method according to claim 11 wherein the picture type is bidirectionally predicted.

15. A digital signal processor for compression encoding of digital video, the processor comprising a video buffer, a quantizer that supplies data to the video buffer at a bit rate, and a rate controller that provides a parameter to the quantizer affecting the bit rate, the rate controller being operable to control the parameter through the positioning of an actual buffer occupancy within a dynamically varying working range of buffer occupancies defined by upper and lower buffer occupancy trajectories, to determine the trajectories by forecasting a number of bits required in coding of future pictures, and chosen such that upper and lower limits of the working range correspond respectively with attainment within a forecast period of predetermined maximum and minimum buffer occupancies, the number of bits assigned to any picture being limited to a maximum such that the dynamically varying working range always exceeds a specified minimum length.

16. A digital signal processor according to claim 15, wherein the rate controller is further operable to forecast the number of bits required in coding of future pictures by estimating the number of bits required for each picture in a group of pictures.

17. A digital signal processor according to claim 15, wherein the rate controller is further operable to forecast the number of bits required in coding of future pictures by estimating from recent coding history the number of bits required for different parts of each picture.

18. A digital signal processor according to claim 15, wherein the parameter affecting bit rate is a quantizer scale.

* * * * *

UNITED STATES PATENT AND TRADEMARK OFFICE
CERTIFICATE OF CORRECTION

PATENT NO. : 6,865,224 B1
DATED : March 8, 2005
INVENTOR(S) : Michael James Knee and Emma Gottesman It is certified that error appears in the above-identified patent and that said Letters Patent is hereby corrected as shown below:

Title page,
Item [56], References Cited, U.S. PATENT DOCUMENTS, please add:
-- 5,671,298
  5,991,456
  5,438,625
  5,512,956
  5,802,218
  6,005,952
  6,437,827
  6,539,120
  5,086,488
  5,142,380
  5,249,053
  5,629,779
  5,642,115
  5,748,245
  5,831,688
  5,930,398
  6,163,573
  6,285,716
  5,812,197
  2001-0031009 --

Signed and Sealed this

Thirtieth Day of August, 2005

JON W. DUDAS
*Director of the United States Patent and Trademark Office*